(12) United States Patent
Lee

(10) Patent No.: US 12,522,309 B2
(45) Date of Patent: Jan. 13, 2026

(54) SUSPENSION SEATPOST

(71) Applicant: GLORY WHEEL ENTERPRISE CO., LTD., Taichung (TW)

(72) Inventor: Chien-Hao Lee, Taichung (TW)

(73) Assignee: GLORY WHEEL ENTERPRISE CO., LTD., Taichung (TW)

( * ) Notice: Subject to any disclaimer, the term of this patent is extended or adjusted under 35 U.S.C. 154(b) by 133 days.

(21) Appl. No.: 18/457,469

(22) Filed: Aug. 29, 2023

(65) Prior Publication Data

US 2024/0076002 A1   Mar. 7, 2024

(30) Foreign Application Priority Data

Sep. 1, 2022 (TW) .................................. 111133214
Sep. 1, 2022 (TW) .................................. 111133215
Aug. 15, 2023 (TW) .................................. 112130647

(51) Int. Cl.
*B62J 1/04* (2006.01)
*B62J 1/06* (2006.01)

(52) U.S. Cl.
CPC ........ *B62J 1/04* (2013.01); *B62J 1/065* (2013.01)

(58) Field of Classification Search
CPC .................. B62J 1/04; B62J 1/065; B62J 1/08
See application file for complete search history.

(56) References Cited

U.S. PATENT DOCUMENTS

| 5,833,255 | A | * | 11/1998 | Sarder | ...................... | B62J 1/065 |
|---|---|---|---|---|---|---|
| | | | | | | 280/220 |
| 9,957,008 | B1 | | 5/2018 | Tsai | | |
| 2018/0334212 | A1 | | 11/2018 | Bowers et al. | | |
| 2020/0207172 | A1 | | 7/2020 | Song | | |
| 2021/0155307 | A1 | | 5/2021 | Montplaisir et al. | | |
| 2021/0300492 | A1 | | 9/2021 | LaForge et al. | | |

FOREIGN PATENT DOCUMENTS

| CN | 203511946 U | 4/2014 |
|---|---|---|
| EP | 2698310 B1 | 5/2018 |
| FR | 2729631 A1 | 7/1996 |
| TW | M256334 U | 2/2005 |
| TW | M329604 U | 4/2008 |
| TW | 201040059 A | 11/2010 |
| TW | M598259 U | 7/2020 |
| TW | M610848 U | 4/2021 |
| TW | 202120369 A | 6/2021 |
| TW | M615077 U | 8/2021 |

* cited by examiner

*Primary Examiner* — Milton Nelson, Jr.
(74) *Attorney, Agent, or Firm* — Best & Flanagan LLP

(57) ABSTRACT

A suspension seatpost includes a linkage assembly and an elastic component. The linkage assembly defines a space, and the elastic component can be placed in the space. The elastic component has at least two different elastic coefficients, and the elastic component can be aligned to multiple interlocking parts of the linkage assembly in multiple different modes and placed in the space.

13 Claims, 22 Drawing Sheets

SUSPENSION SEATPOST

FIELD OF INVENTION

The present invention relates to a bicycle suspension seatpost.

BACKGROUND OF THE INVENTION

Conventional bicycle suspension seatposts mostly offer only one type of shock-absorbing elasticity coefficient. Additionally, changing the elasticity coefficient of these bicycle suspension seatposts is not easily done and requires replacing the entire seatpost or relying on professionals to adjust the elasticity coefficient with a time-consuming and complex process. Therefore, the development of a bicycle suspension seatpost that allows for convenient and rapid adjustment of the elasticity coefficient has become an urgently desired goal in the related field.

SUMMARY OF THE INVENTION

To solve abovementioned problems, this present invention discloses a suspension seatpost comprising a linkage assembly and an elastic component, wherein the linkage assembly defines a space, and the elastic component is placed in the space; the elastic component comprises at least two different elastic coefficients; and the elastic component is aligned to multiple interlocking parts of the linkage assembly in multiple different modes and placed in the space.

Wherein, the elastic component is made of one single material.

Wherein, the elastic component comprises an encapsulating material and an encapsulated material, wherein the encapsulated material is at least partially embedded within the encapsulating material, and the encapsulating material and the encapsulated material have different elastic coefficients.

Wherein, the elastic component comprises a hole, and the hole is an elongated through hole with two rounded ends.

Wherein, the elastic component comprises multiple holes, the holes are embedded inside or extend through the elastic component.

Wherein, the elastic component comprises a porous structure with multiple pores, and the pores are not uniformly distributed within the elastic component.

Wherein, the interlocking parts comprise two locating holes defined in the linkage assembly, and two locating pins are mounted in the locating holes respectively, wherein one end of each of the locating pins extends into the space.

Wherein, the locating holes are threaded holes and each locating pin comprises a bolt with a threaded surface.

Wherein, one side of each one of the locating holes comprise an unthreaded hole, and a diameter of the unthreaded hole is smaller than a diameter of the locating hole.

Wherein, each locating pin further comprises a nut, wherein the nut of each locating pin is equipped with a through-hole that prevents relative rotation with tools, and the bolt of each locating pin further comprises a tool hole formed at one end of the bolt facing the nut.

Wherein, two cavities are formed in the linkage assembly at positions defining the locating holes and communicating with the space, wherein each cavity comprises a first cavity with a large diameter and a second cavity with a small diameter; and an abutment ring is held within the first cavity of each of the cavities and connected with a corresponding one of the locating pins, and an elastic element is positioned within the second cavity of each of the cavities, wherein one end of the elastic element abuts against the abutment ring, and the other end of the elastic element abuts against a bottom surface of the second cavity.

Wherein, the elastic element is a spring.

Wherein, two cavities are formed in the linkage assembly respectively at positions defining the locating holes and communicating the space, wherein an unthreaded hole is formed in the other end of each of the locating holes away from the space; each cavity is equipped with an abutment element, and an expanded head is formed in one end of a corresponding one of the locating pins away from the space, wherein the expanded head of the locating pin is placed in the unthreaded hole; and an elastic piece is positioned within the unthreaded hole in each of the locating holes and has two ends resting against a surface of the unthreaded hole and the head of the corresponding one of the locating pins respectively.

DETAILED DESCRIPTION OF THE PREFERRED EMBODIMENTS

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Figure 1:
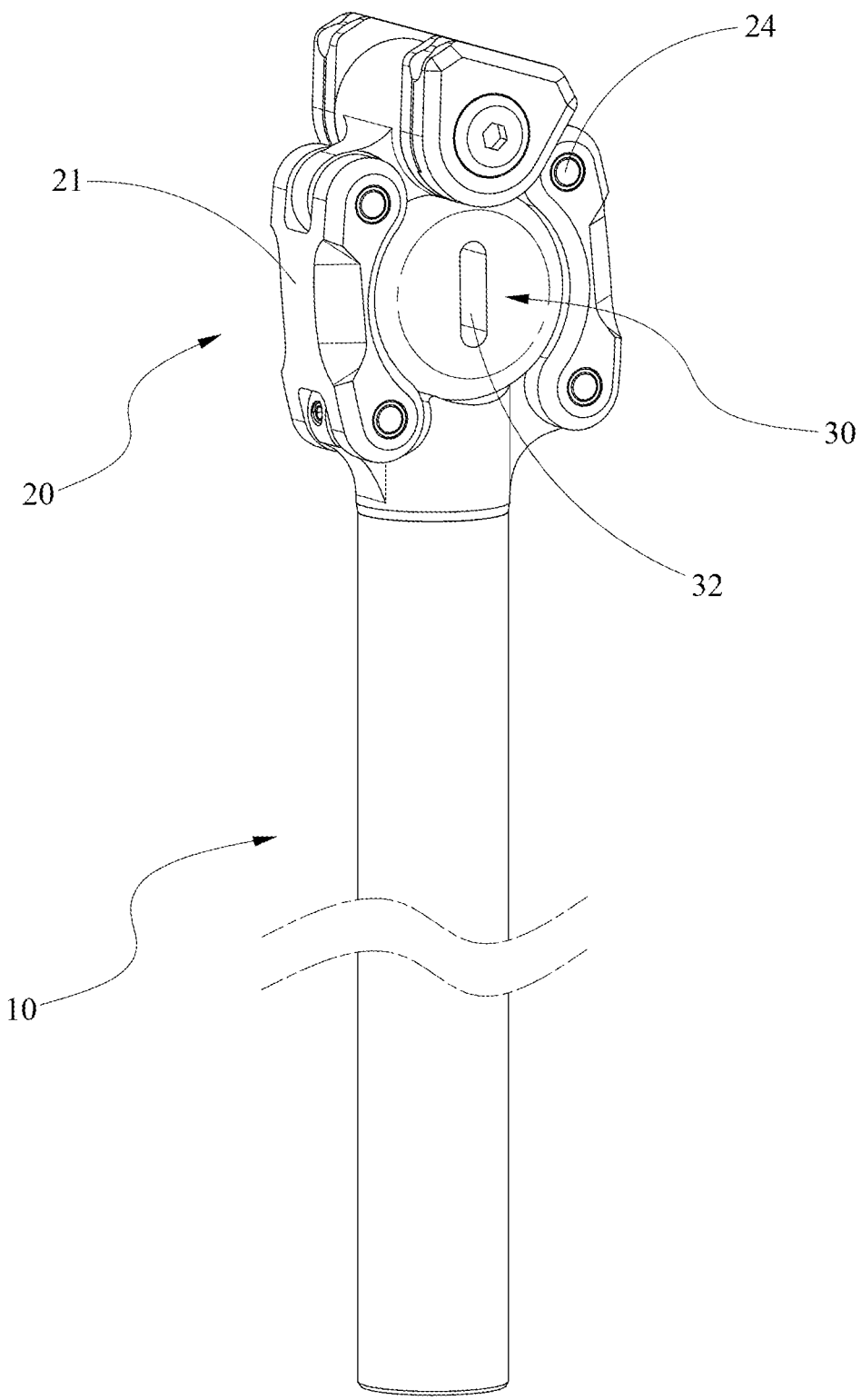
FIG. 1 is a perspective view of a first preferred embodiment of a seatpost in accordance with the present invention.
Figure 3:
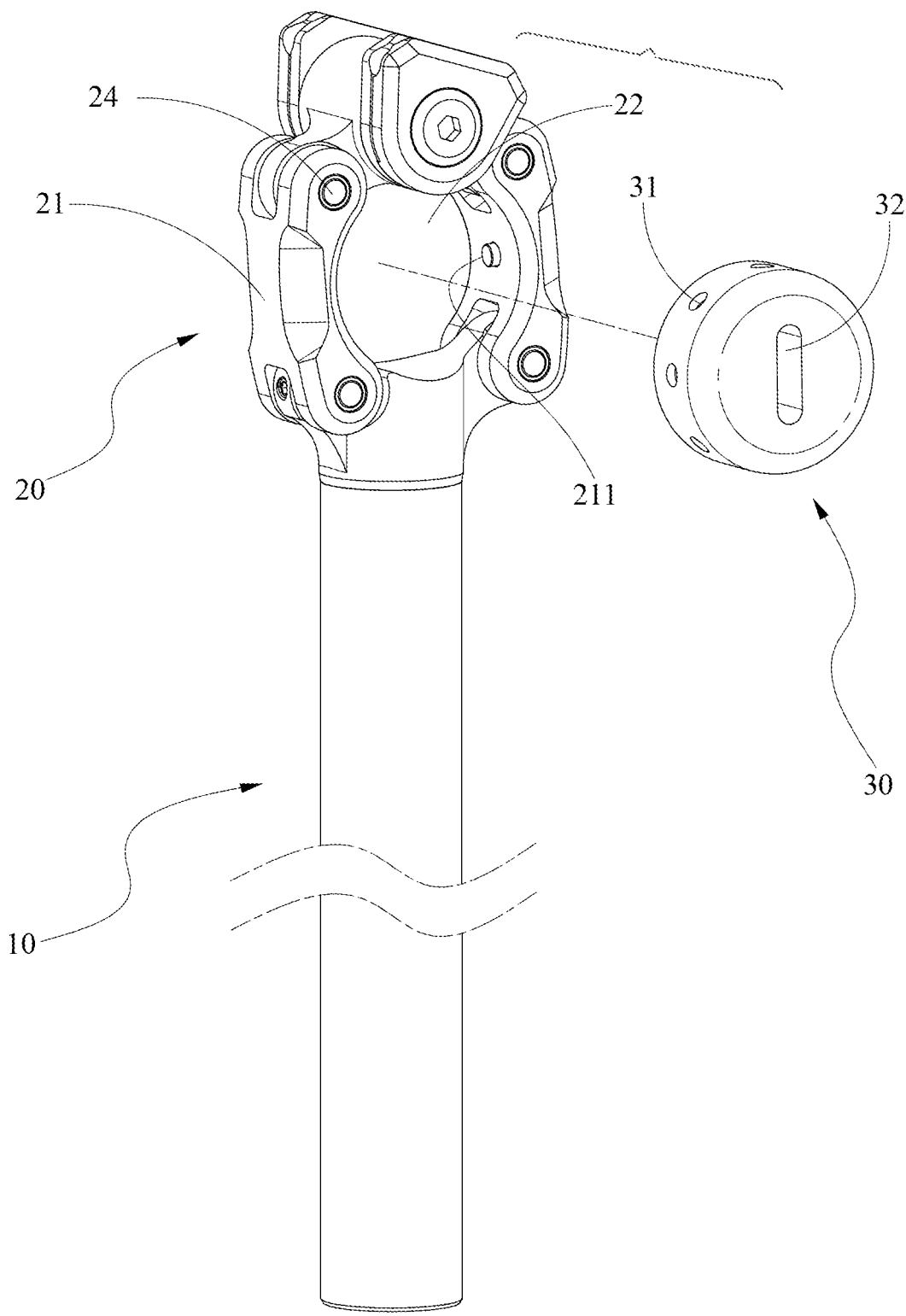
FIG. 3 is an exploded perspective view of the seatpost in FIG. 1.
Figure 5:
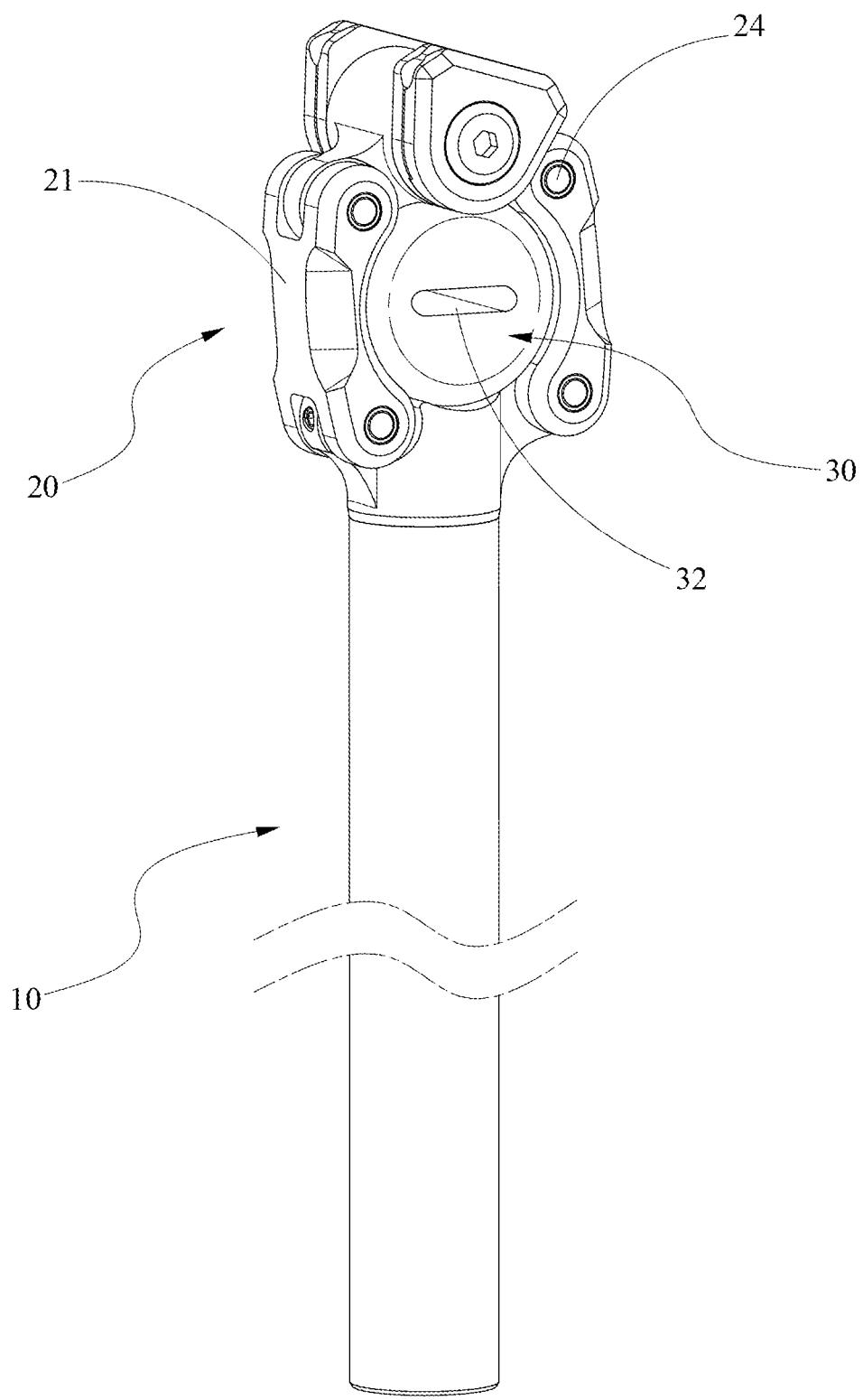
FIG. 5 is an operational perspective view of the seatpost in FIG. 1.

With reference to FIG. 1, FIG. 3, and FIG. 5, a first preferred embodiment of a suspension seatpost 10 in accordance with this invention is shown. The suspension seatpost 10 includes a linkage assembly 20. In this embodiment, the linkage assembly 20 is a four-bar linkage, the four-bar linkage comprises four links 21 connected with each other by multiple pivots 24. These links 21 are pivotally connected with each other at both ends by the pivots 24, and a space 22 is formed between the links 21. The links 21 can rotate around the pivots 24 as axes, thereby the size of the space 22 defined by the linkage assembly 20 can be altered. The space 22 can hold an elastic component 30 inside. In the first preferred embodiment, the elastic component 30 is a cylindrical elastic body. The elastic component 30 is made of one single material. The term "single material" in this invention refers to the material being a single substance or a homogenous mixture of substances. Furthermore, the elastic component 30 has at least two different elasticity coefficients; that is, when a same stress is applied to the elastic component 30 in different directions, the elastic component 30 has at least two distinct strains or deformations.

Figure 2:
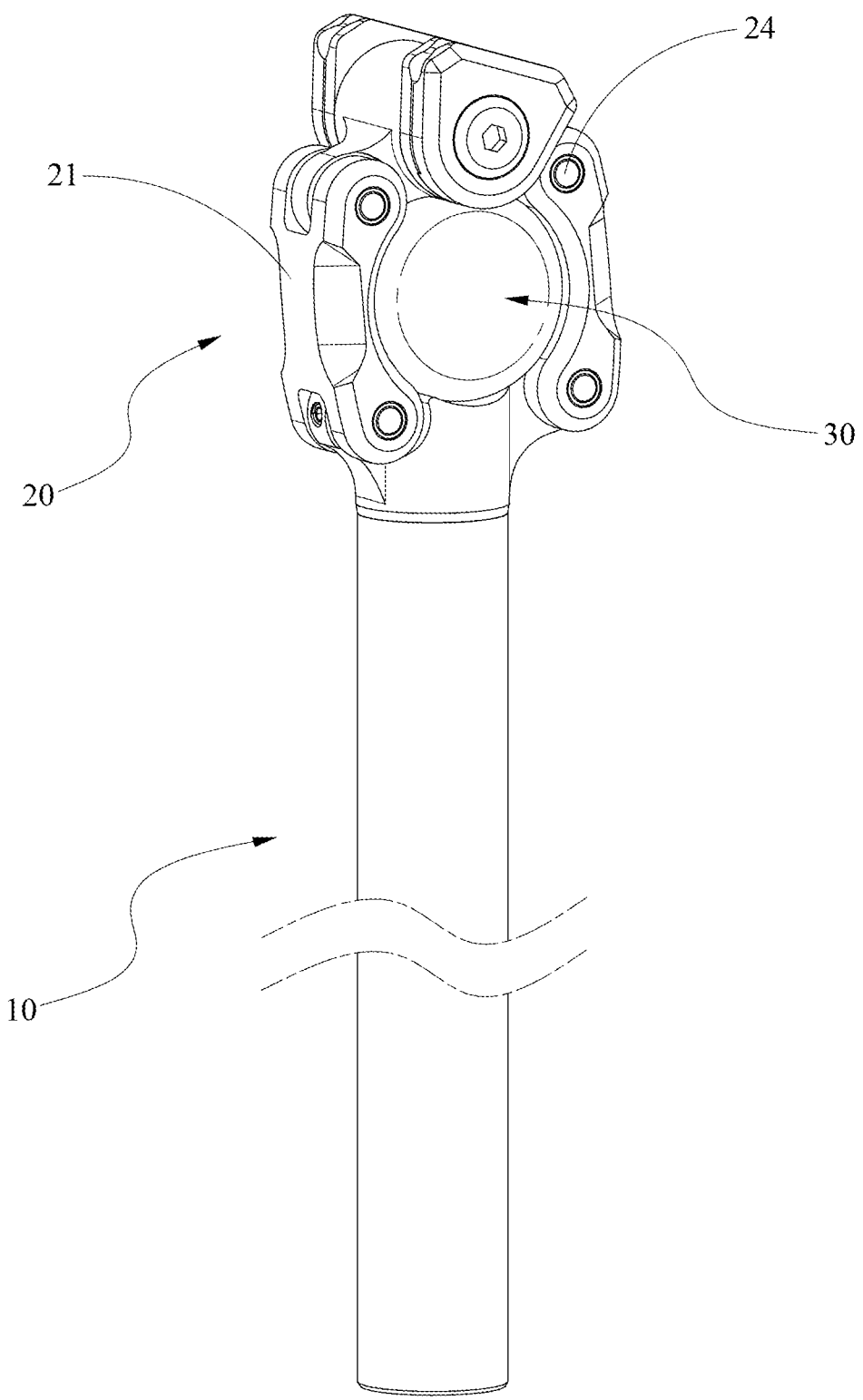
FIG. 2 is a perspective view of a second preferred embodiment of a seatpost in accordance with the present invention.
Figure 4:
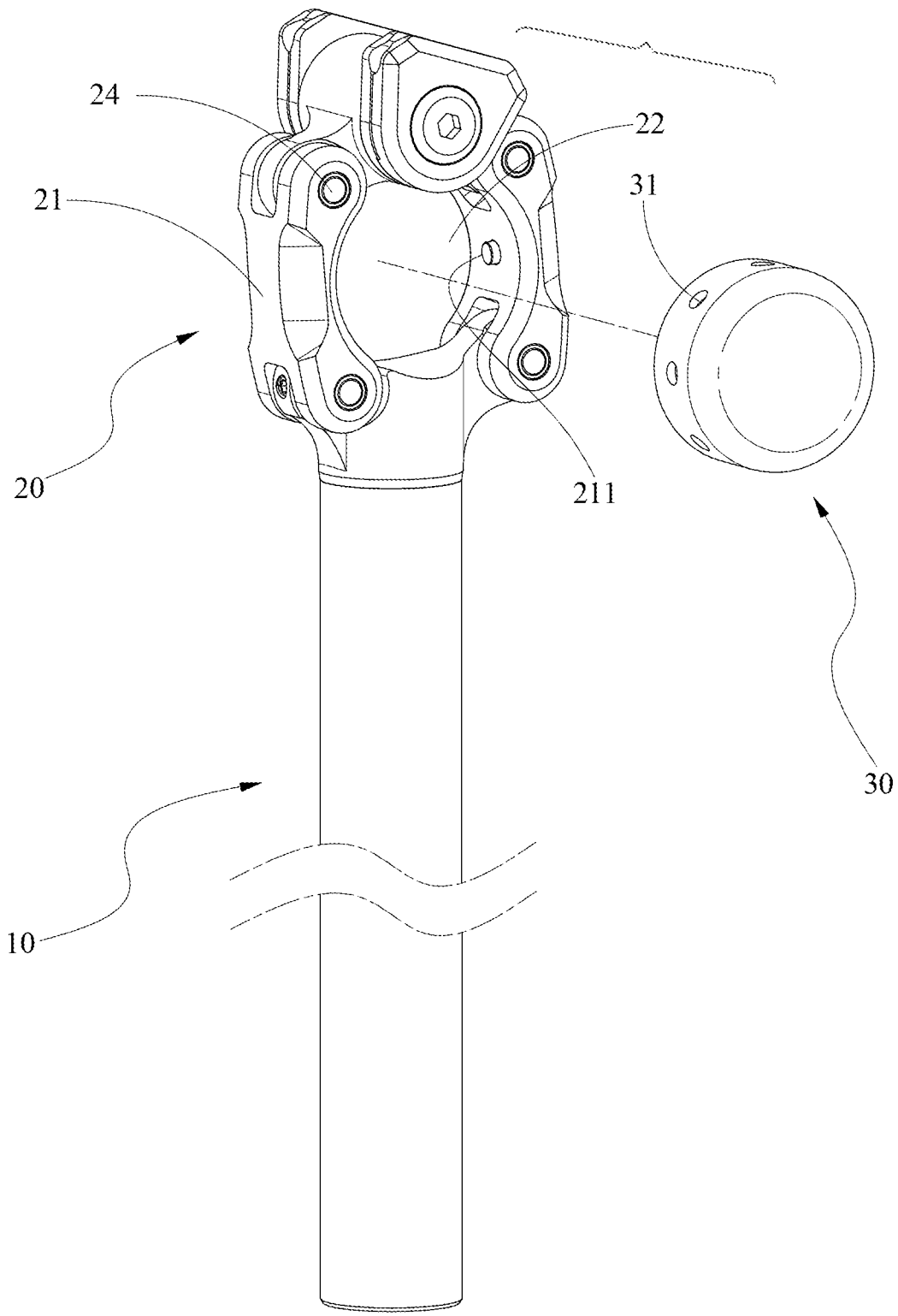
FIG. 4 is an exploded perspective view of the seatpost in FIG. 2.

With reference to FIG. 2 and FIG. 4, in a second preferred embodiment, the elastic component 30 is a cylindrical elastic body. The elastic component 30 includes an encapsulating material 32 and an encapsulated material. In addition, an elasticity coefficient of the encapsulating material 32 is different from an elasticity coefficient of the encapsulated material. In the preferred embodiment, the encapsulated material of the elastic component 30 is distributed anisotropically or non-uniformly within the encapsulating material 32. Due to the different material elasticity coefficients between the encapsulating material 32 and the encapsulated material, the elastic component 30 contains at least two different elasticity coefficients.

With reference to FIG. 1 to FIG. 5, in the first preferred embodiment and the second preferred embodiment, at least one of the links 21 of the linkage assembly 20 has an interlocking part 211. The interlocking part 211 fastens the elastic component 30 to be aligned in a mode with the links 21 and placed within the space 22. In the preferred embodiments, the linkage assembly 20 is a four-bar linkage, in which two of the links 21 have an interlocking part 211 respectively, and the interlocking part 211 is a protrusion on an inner surface of each of the links 21. Furthermore, the elastic component 30 has multiple interlocking indentations 31 formed in a circumferential surface, and some of the interlocking indentations 31 correspond to the interlocking parts 211. In some other embodiments, the interlocking parts 211 can also be engaged with the elastic component 30 through mechanisms or structures such as protrusions, recesses, grooves, or magnetic forces. Alternatively, the interlocking parts 211 can be positioning holes in some or all of the links 21 of the linkage assembly 20 with positioning pins extending through the positioning holes and engaged with some of or all of the interlocking indentations 31 of the elastic component 30. Therefore, the elastic component 30 can be aligned in a mode with the links 21 and positioned within the space 22.

The term "mode" refers to a configuration wherein the elastic component 30 is positioned within the space 22 defined by the links 21. In this situation, the elastic component 30 does not rotate with changes of the space 22 due to the movement of the links 21, and the interlocking indentations 31 of the elastic component 30 do not disengage from the interlocking parts.

FIG. 5 shows an alternative mode of the first preferred embodiment of the suspension seatpost 10 in accordance with the present invention. In FIG. 5, the elastic component 30 is positioned within the space 22 in another mode by aligning the interlocking indentations 31 of the elastic component 30 with the interlocking parts 211 of the links 21 in a way different from the alignment shown in FIG. 1.

With reference to FIG. 3 and FIG. 4, in the preferred embodiments, the linkage assembly 20 is a four-bar linkage, and each of the inner surface of two of the links 21 has a protruding interlocking part 211. The circumferential surface of the elastic component 30 has eight interlocking indentations 31 that selectively correspond to the interlocking parts 211. By rotating the elastic component 30, the interlocking indentations 31 can be aligned with the interlocking parts 211 in various modes, enabling a variety of configurations for positioning the elastic component 30 within the space 22 through multiple modes of alignment with the links 21. In some other embodiments, the interlocking parts 211 can also be engaged with the elastic component 30 in various modes through mechanisms or structures such as protrusions, recesses, grooves, or magnetic forces.

In the first preferred embodiment, a hole 32 is formed in the elastic component 30. The hole 32 is an elongated through hole with two rounded ends. By adjusting the mode in which the interlocking indentations 31 engaged with the interlocking parts 211, varying degrees of shock-absorption effects can be generated, leading to different elastic coefficients of the suspension seatpost 10.

Figure 6:
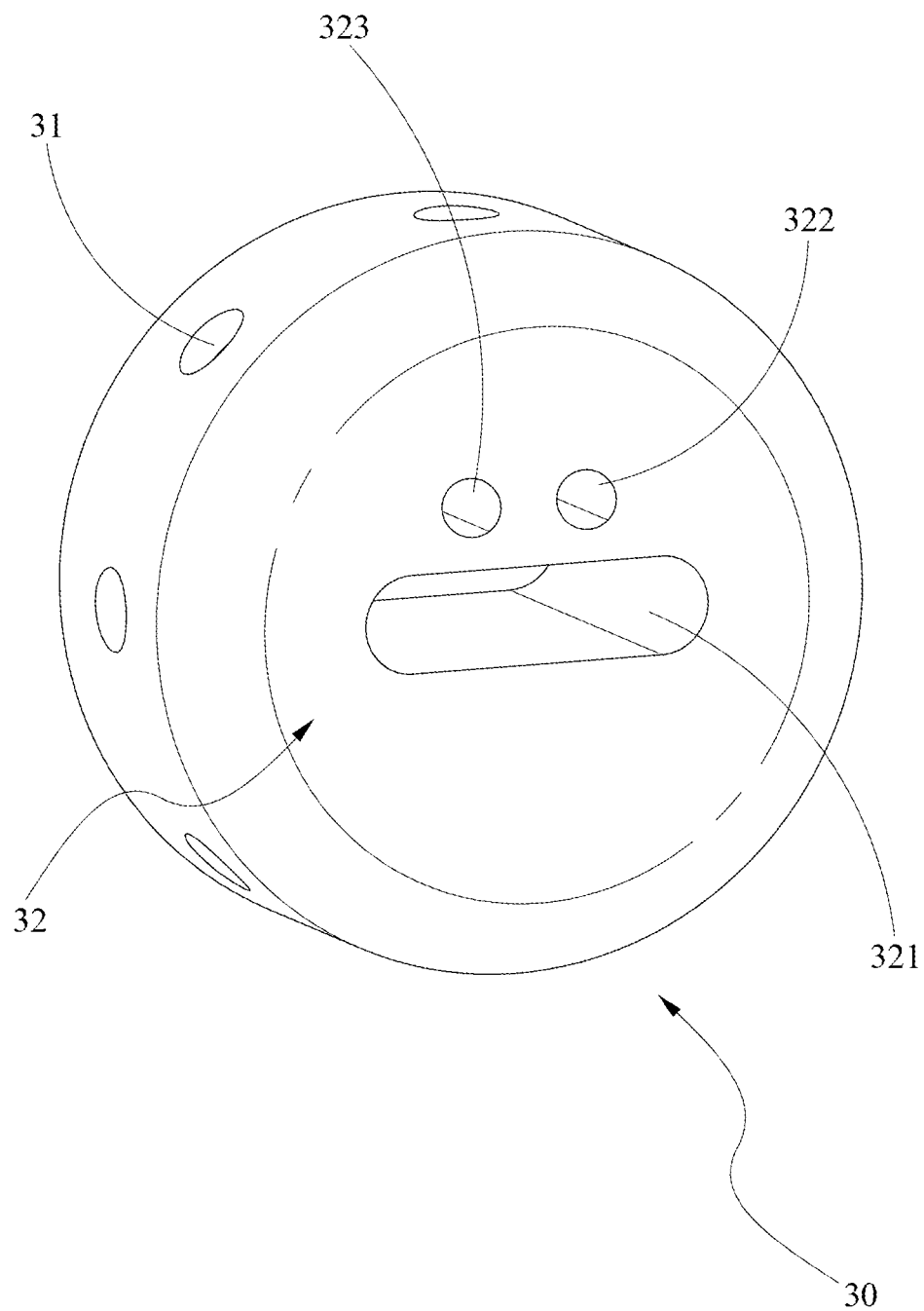
FIG. 6 is a perspective view of a third preferred embodiment of an elastic component for a seatpost in accordance with the present invention.

With reference to FIG. 6, a third preferred embodiment of an elastic component 30 in accordance with this invention is shown. The elastic component 30 is a rounded-edge cylinder with three through holes, namely a first through hole 321, a second through hole 322, and a third through hole 323. Through the distribution of the first through hole 321, the second through hole 322, and the third through hole 323, the non-isotropic variations in the elastic coefficients of the elastic component 30 are further enhanced.

Preferably, some of the holes 32 defined through the elastic component 30 along different axes. As a result, the holes 32 are not confined to specific axial orientations. The quantity of the holes 32 is also not restricted. Ideally, there are no overlapping between the holes 32 to prevent unexpected deformations in the elastic component 30.

Figure 7:
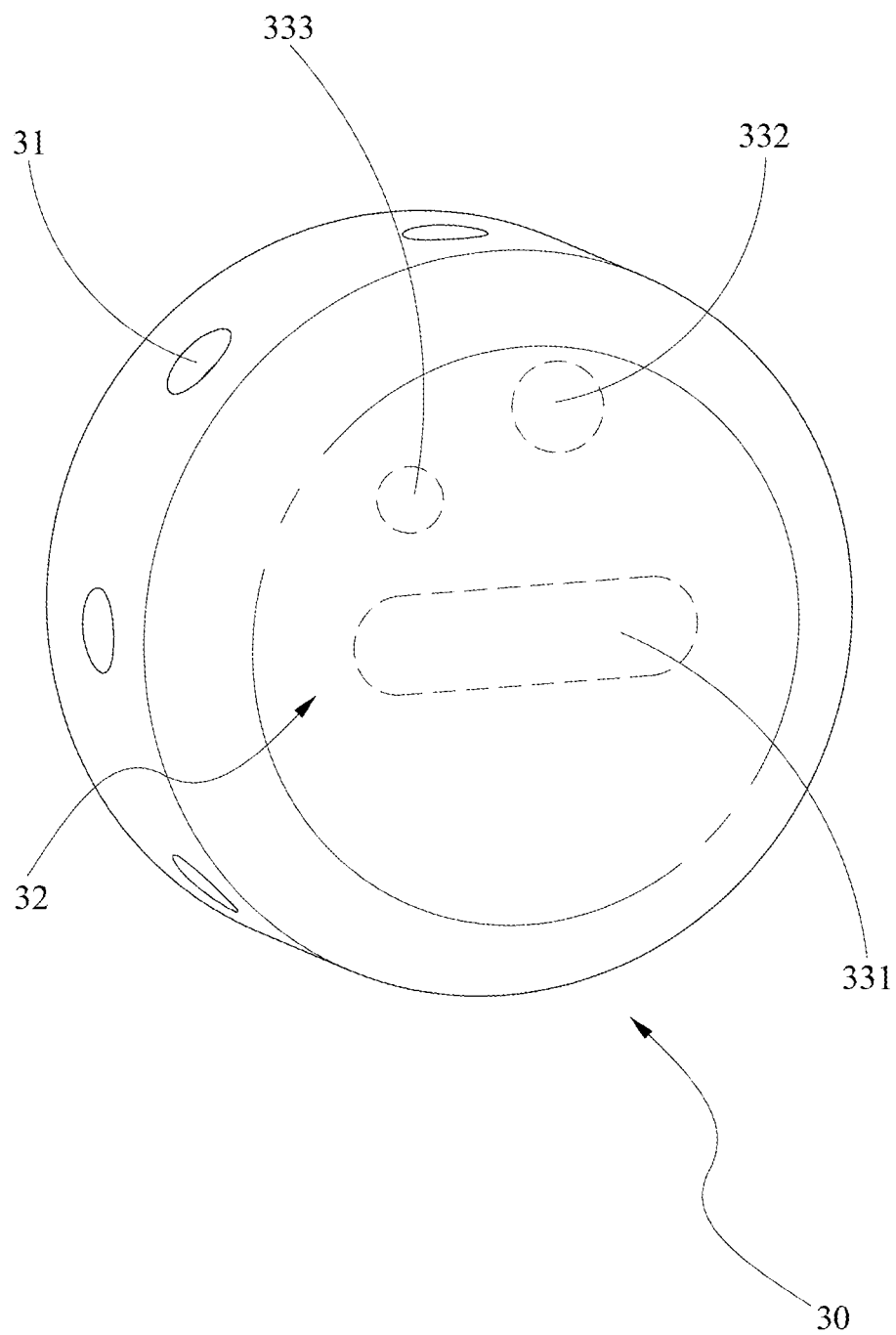
FIG. 7 is a perspective view of a fourth preferred embodiment of an elastic component for a seatpost in accordance with the present invention.

With reference to FIG. 7, a fourth preferred embodiment of an elastic component 30 in accordance with this invention is shown. The elastic component 30 is a rounded-edge cylinder with three buried holes, namely an elongated first hole 331, a spherical second hole 332, and a third hole 333. Preferably, the holes 32 are distributed in a non-uniform manner within the elastic component 30 to create variations in elastic coefficients along different directions.

Figure 8:
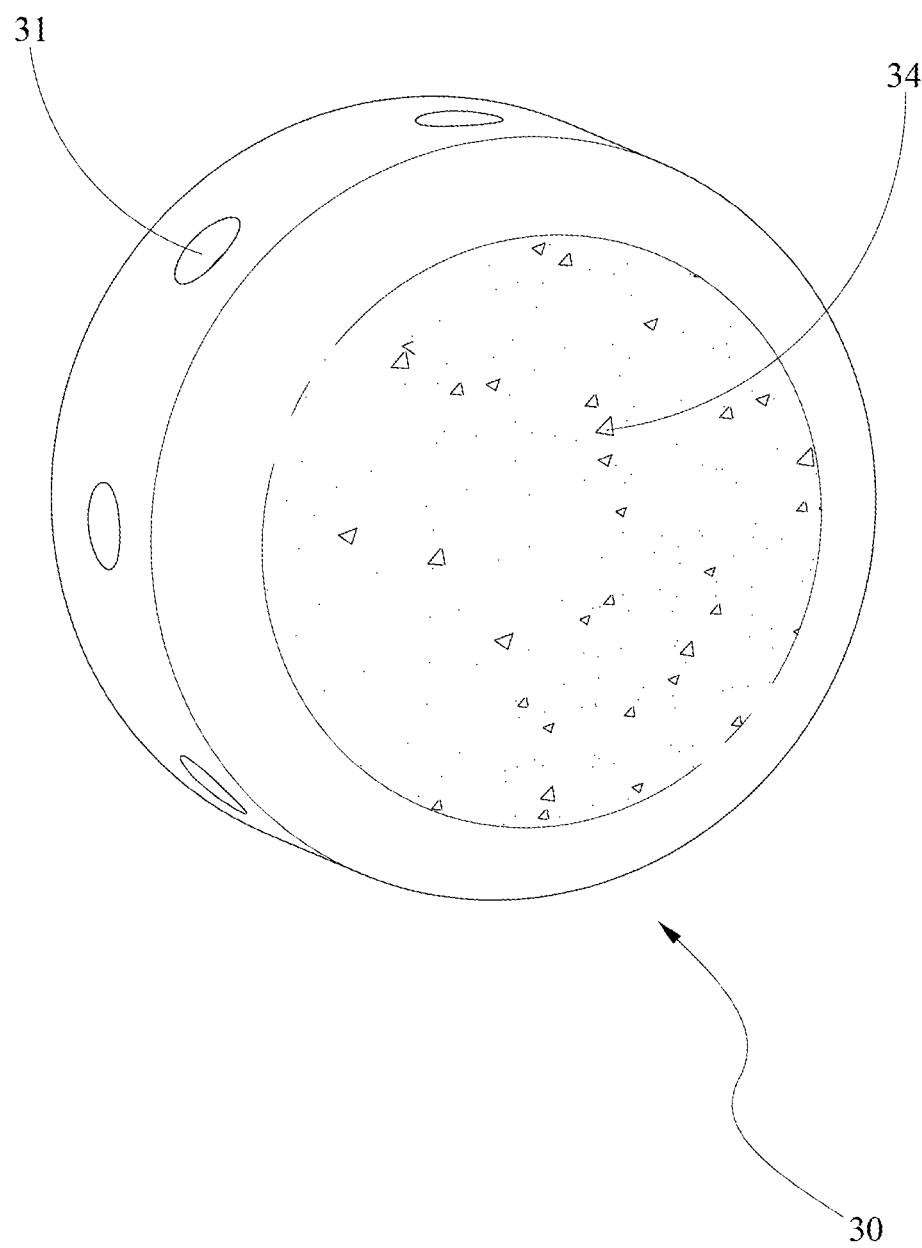
FIG. 8 is a perspective view of a fifth preferred embodiment of an elastic component for a seatpost in accordance with the present invention.

With reference to FIG. 8, a fifth preferred embodiment of an elastic component 30 in accordance with this invention is shown. The elastic component 30 is a rounded-edge cylinder with a porous structure. The porous structure incorporates numerous pores 34, and the pores 34 are not uniformly distributed within the elastic component 30, and sizes of the pores 34 are different. In this embodiment, a greater concentration of pores 34 is situated on one side of the elastic component 30 to enhance the non-isotropic variations in elastic coefficients of the elastic component 30.

Figure 9:
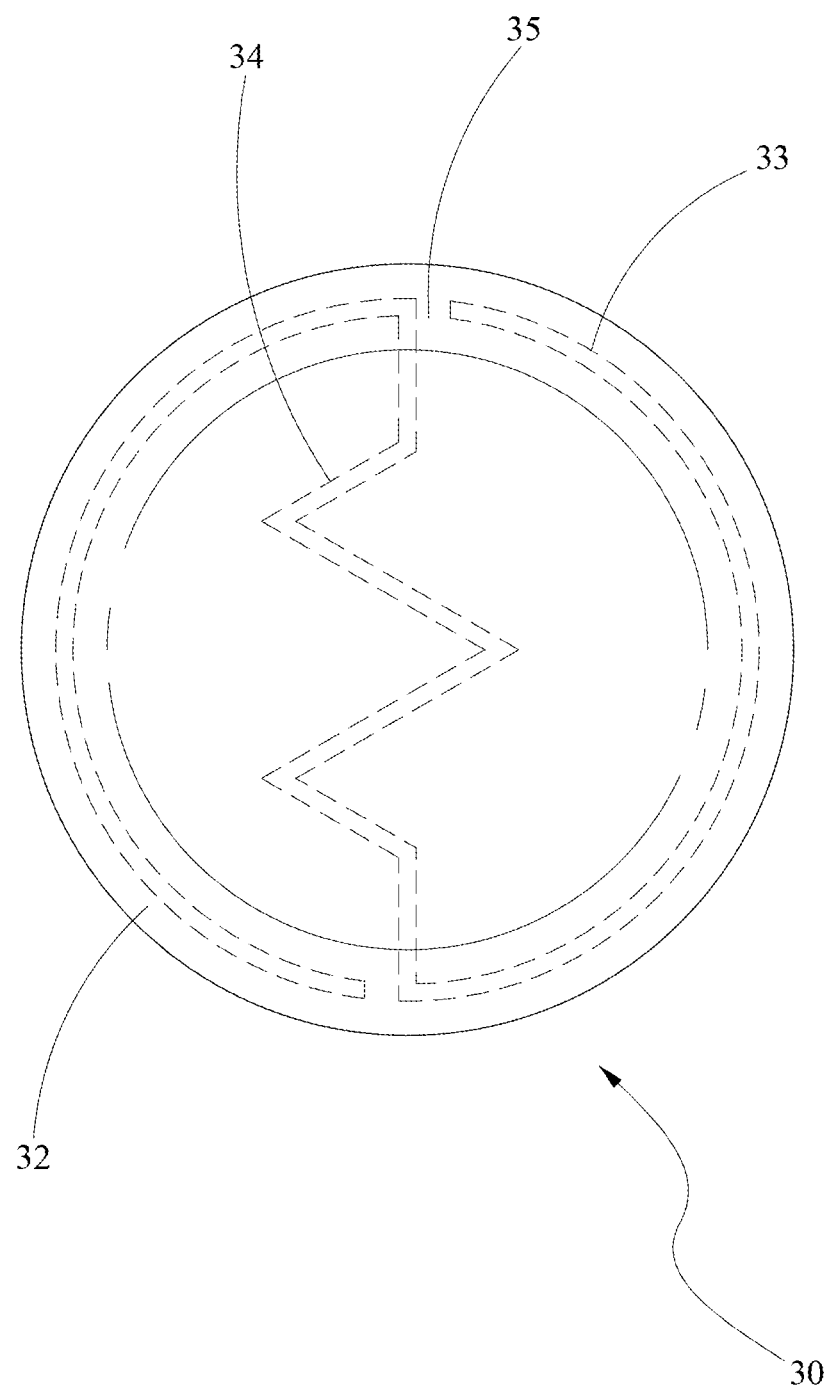
FIG. 9 is a perspective view of a sixth preferred embodiment of an elastic component for a seatpost in accordance with the present invention.

With reference to FIG. 9, a sixth preferred embodiment of an elastic component 30 in accordance with this invention is shown. The elastic component 30 is a rounded edge cylinder, and the elastic component 30 includes a combination of an annular encapsulated material 33 and a zig-zag encapsulated material 34. In the preferred embodiment, two expansion joints 35 are defined in the annular encapsulated material 33. The expansion joints 35 allow limited contraction or expansion of the elastic component 30 when subjected to external forces. The combination of the encapsulating material 32 and the encapsulated materials helps absorb the external forces and achieve shock-absorption effect.

Figure 10:
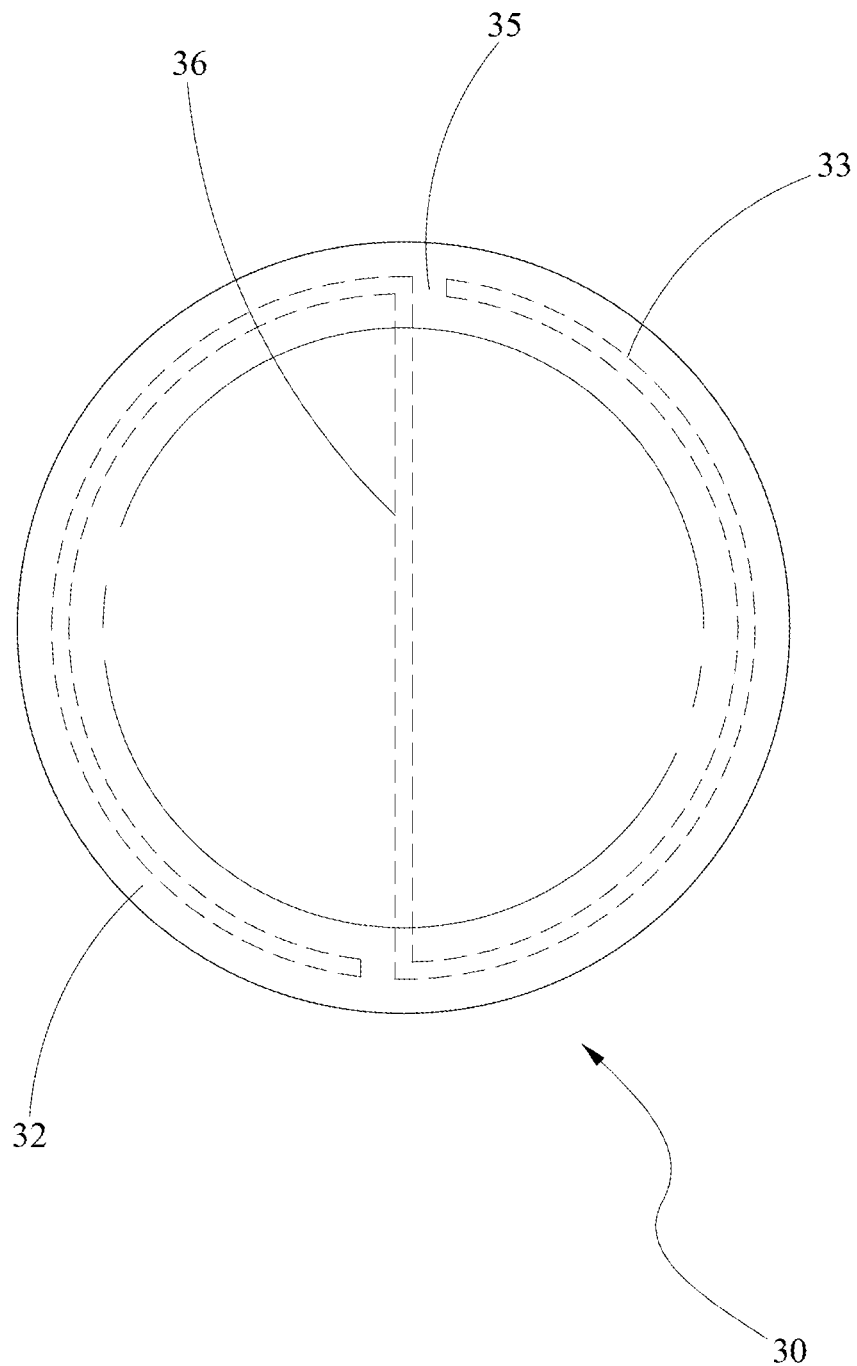
FIG. 10 is a perspective view of a seventh preferred embodiment of an elastic component for a seatpost in accordance with the present invention.

With reference to FIG. 10, a seventh preferred embodiment of an elastic component 30 in accordance with this invention is shown. In this preferred embodiment, the elastic component 30 is a rounded edge cylinder, and the elastic component 30 includes a combination of an annular encapsulated material 33 and a columnar encapsulated material 36. In the preferred embodiment, two expansion joints 35 are defined in the annular encapsulated material 33. The expansion joints 35 allow limited contraction or expansion of the elastic component 30 when subjected to external forces. The combination of the encapsulating material 32 and the encapsulated materials helps absorb the external forces and achieve shock-absorption effect.

Figure 11:
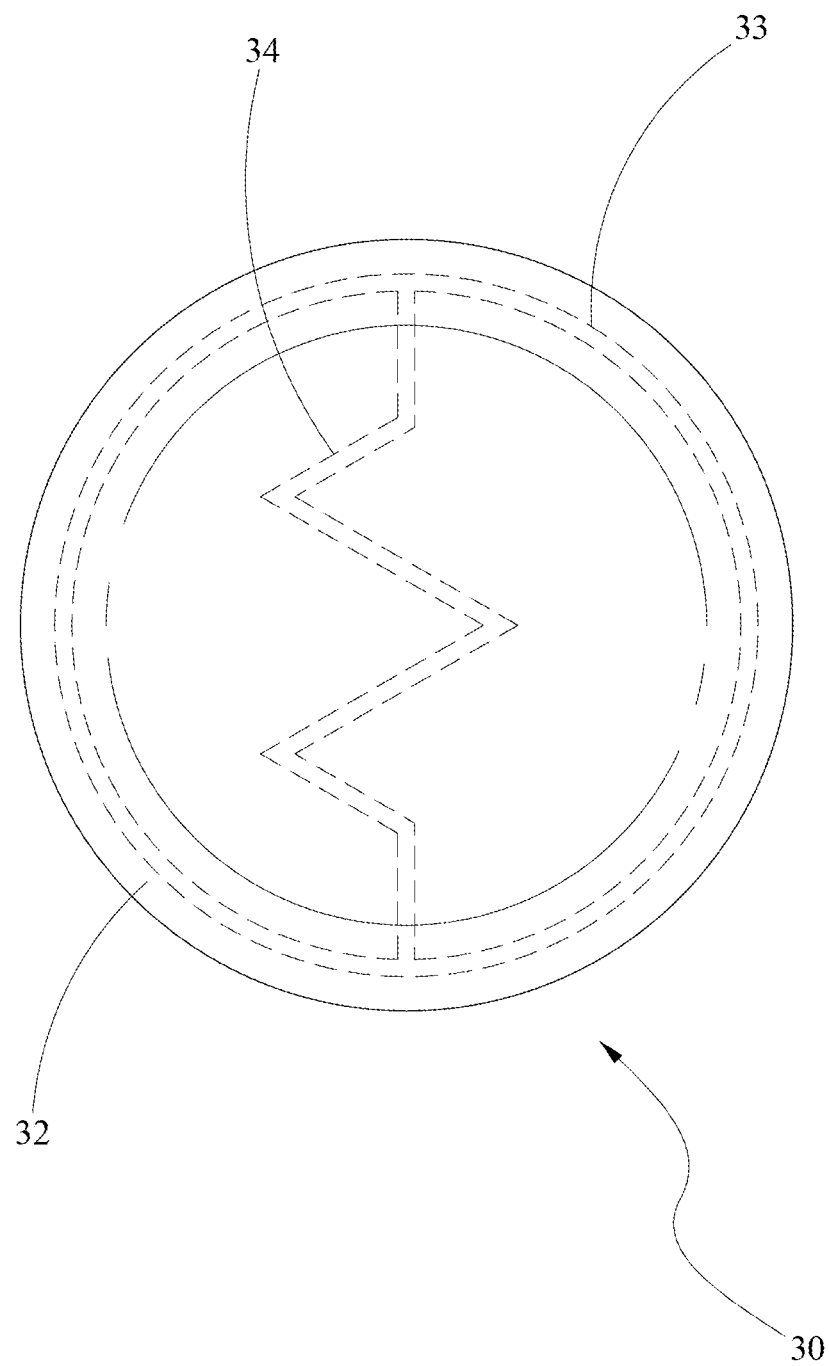
FIG. 11 is a perspective view of an eighth preferred embodiment of an elastic component for a seatpost in accordance with the present invention.

With reference to FIG. 11, an eighth preferred embodiment of an elastic component 30 in accordance with this invention is shown. The elastic component 30 is a rounded edge cylinder, and the elastic component 30 includes a combination of an annular encapsulated material 33 and a zig-zag encapsulated material 34. The combination of the encapsulating material 32 and the deformation of the encapsulated materials helps absorb the forces and achieve the shock-absorption effect.

Figure 12:
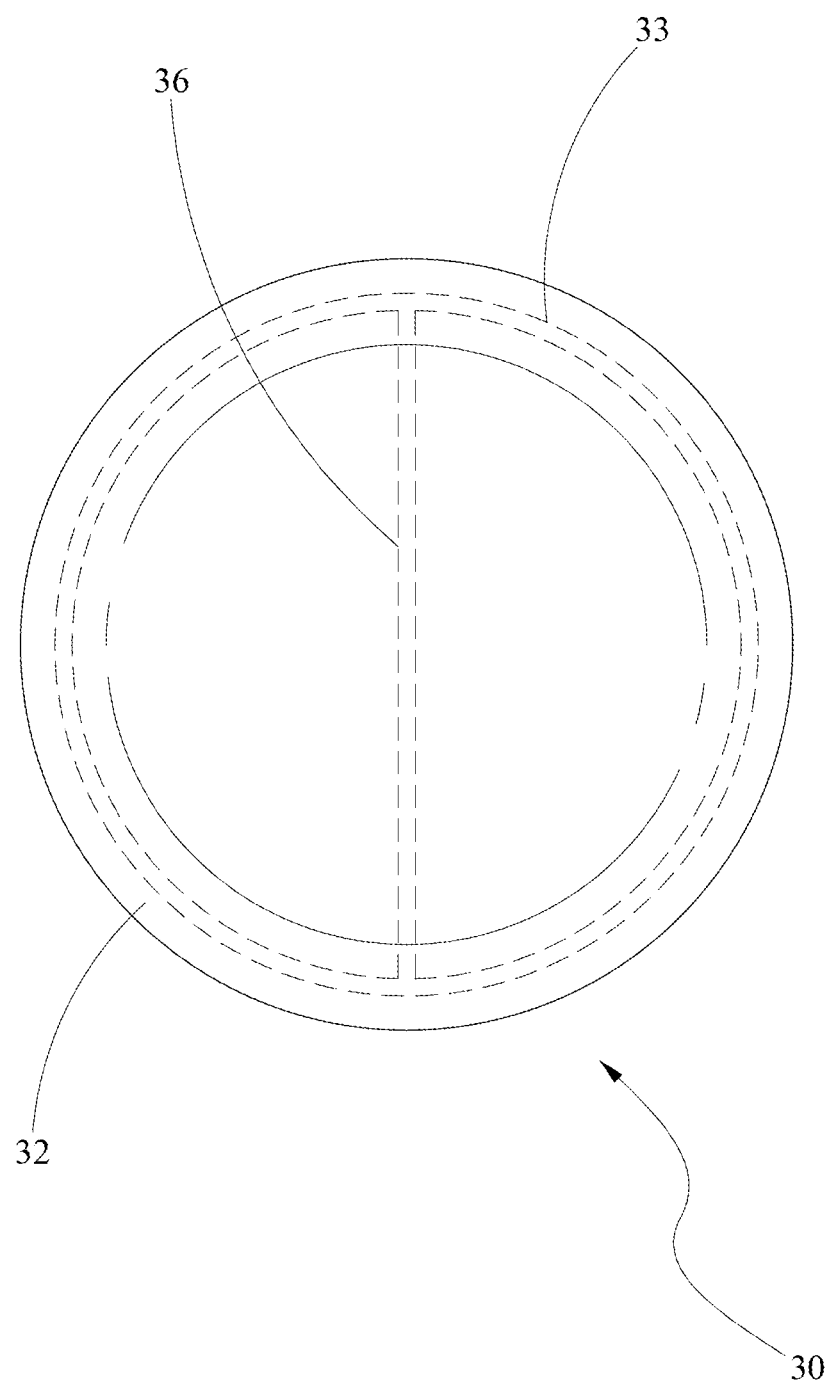
FIG. 12 is a perspective view of a ninth preferred embodiment of an elastic component for a seatpost in accordance with the present invention.

With reference to FIG. 12, a ninth preferred embodiment of an elastic component 30 in accordance with this invention is shown. The elastic component 30 is a rounded edge cylinder, and the elastic component 30 includes a combination of an annular encapsulated material 33 and a columnar encapsulated material 36. The combination of the encapsulating material 32 and the deformation of the encapsulated materials helps absorb the forces and achieve the shock-absorption effect.

Figure 13:
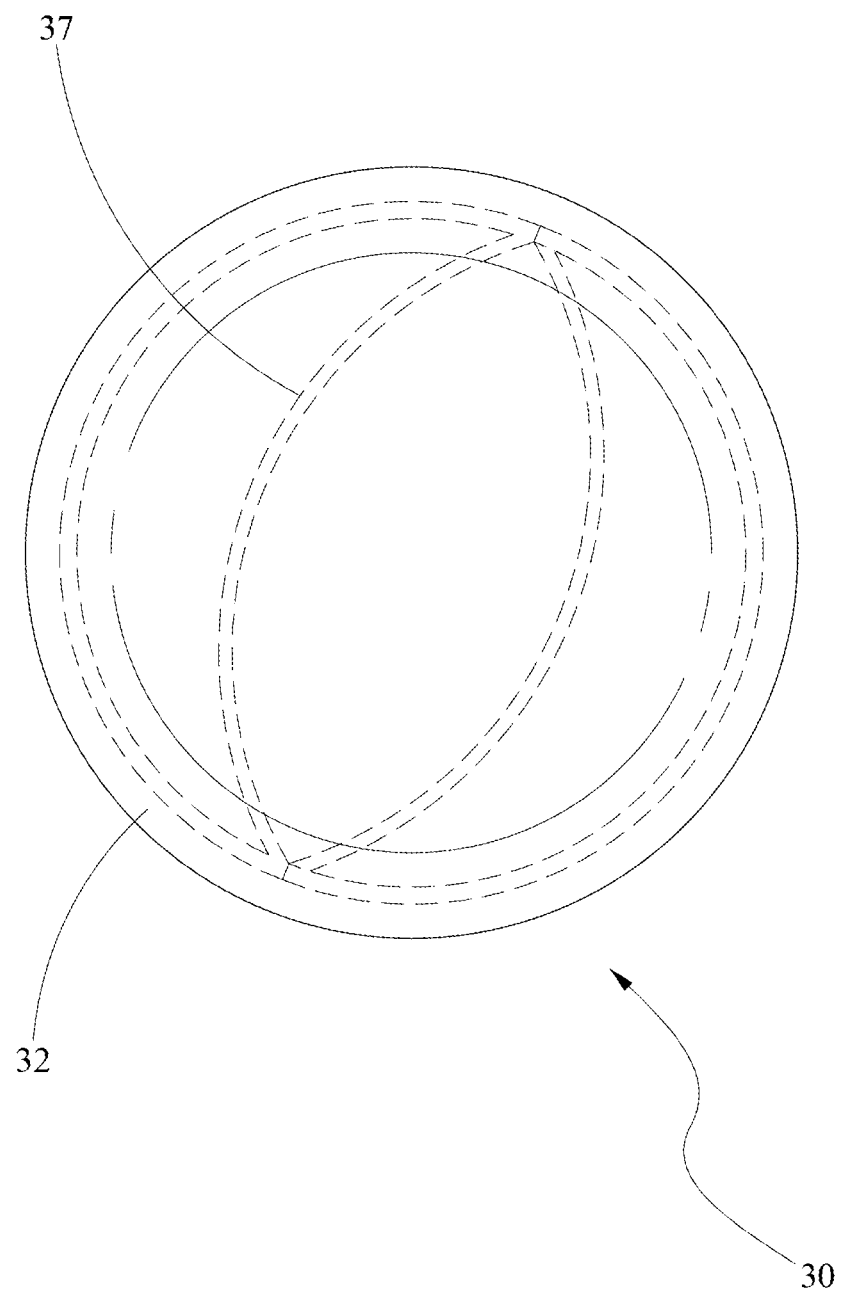
FIG. 13 is a perspective view of a tenth preferred embodiment of an elastic component for a seatpost in accordance with the present invention.

With reference to FIG. 13, a tenth preferred embodiment of an elastic component 30 in accordance with this invention is shown. The elastic component 30 is a rounded edge cylinder, and the elastic component 30 includes a combination of an annular encapsulated material 33 and two arc encapsulated materials 37. Preferably, a width of each of the arc encapsulated materials 37 is narrower than a width of the annular encapsulated material 33, and the two arc encapsulated materials 37 are not situated on the same plane. This design further introduces variations in elastic coefficients of the elastic component 30 to achieve multiple shock-absorption effects through the deformation of the encapsulating material 32 and the encapsulated materials.

Figure 14:
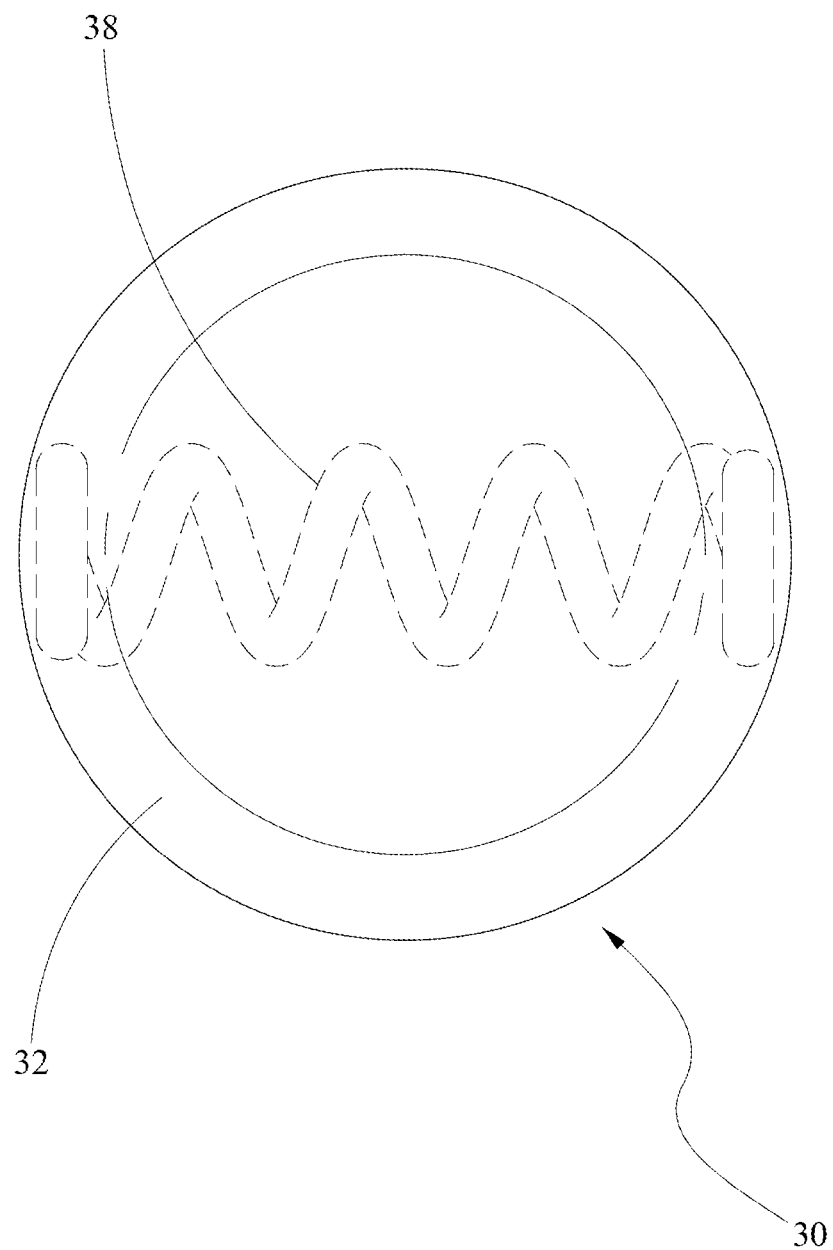
FIG. 14 is a perspective view of an eleventh preferred embodiment of an elastic component for a seatpost in accordance with the present invention.

With reference to FIG. 14, an eleventh preferred embodiment of an elastic component 30 in accordance with this invention is shown. The elastic component 30 is a rounded edge cylinder, and the encapsulated material is composed of a spring 38. A spiral structure of the spring 38 further enhancing the non-isotropic variations in elastic coefficients of the elastic component 30, resulting in multiple shock-absorption effects.

Preferably, the encapsulating materials of the elastic component 30 can be composed of various materials and structures. In one embodiment, the encapsulating materials of the elastic component 30 include the spring 38 and the annular encapsulated material 33 embedded within the encapsulating material 32. This arrangement creates finer variations and changes in elasticity of the elastic component 30. In another embodiment, the encapsulating materials of the elastic component 30 include the annular encapsulated material 33, the zig-zag encapsulated material 34, and the columnar encapsulated material 36. The zig-zag encapsulated material 34 and the columnar encapsulated material 36 are interconnected in a mutually perpendicular manner and are embedded within the encapsulating material 32.

Figure 15:
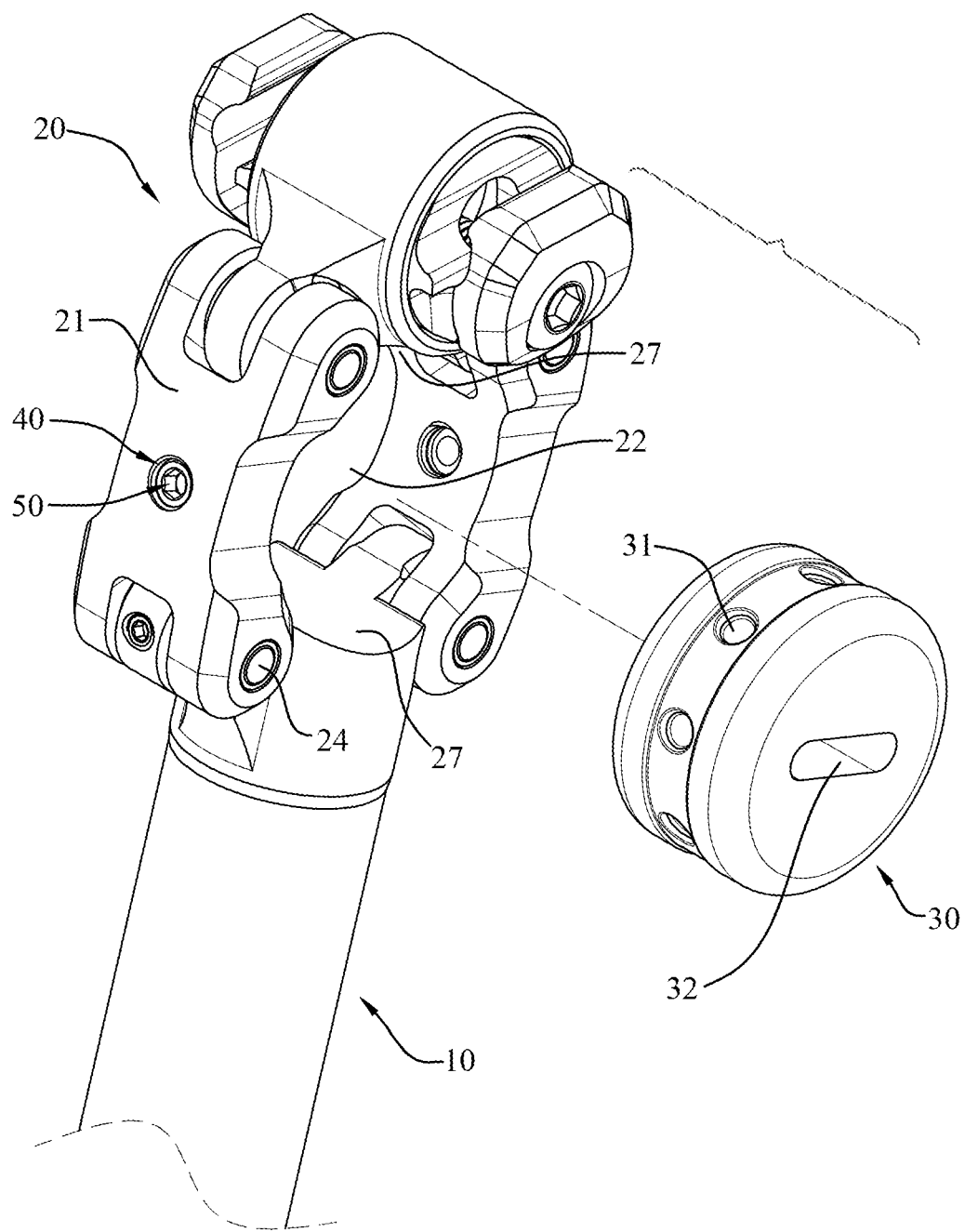
FIG. 15 is an exploded perspective view of another preferred embodiment of a seatpost in accordance with the present invention.
Figure 16:
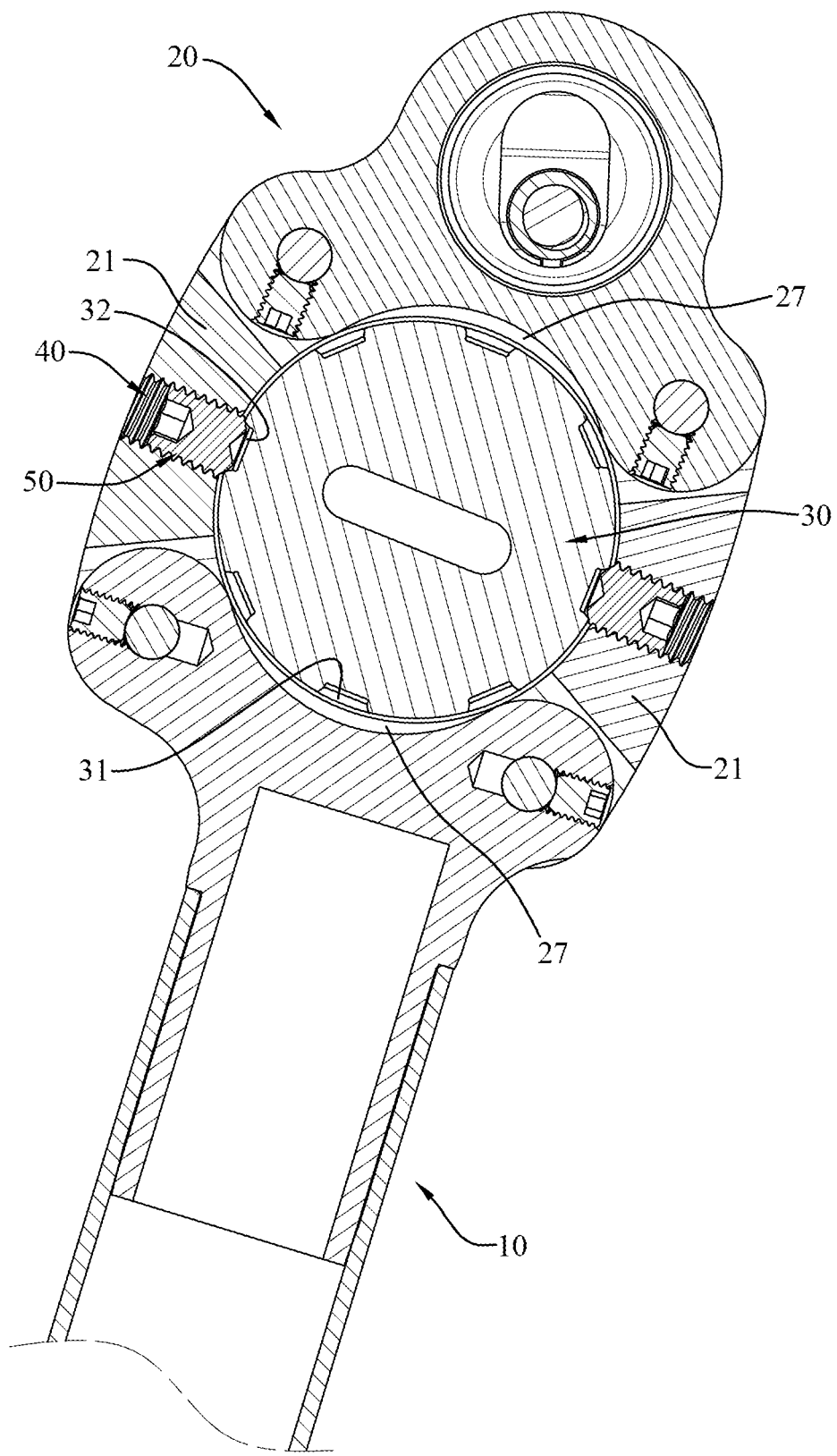
FIG. 16 is a cross-sectional side view of the seatpost in FIG. 15.
Figure 17:
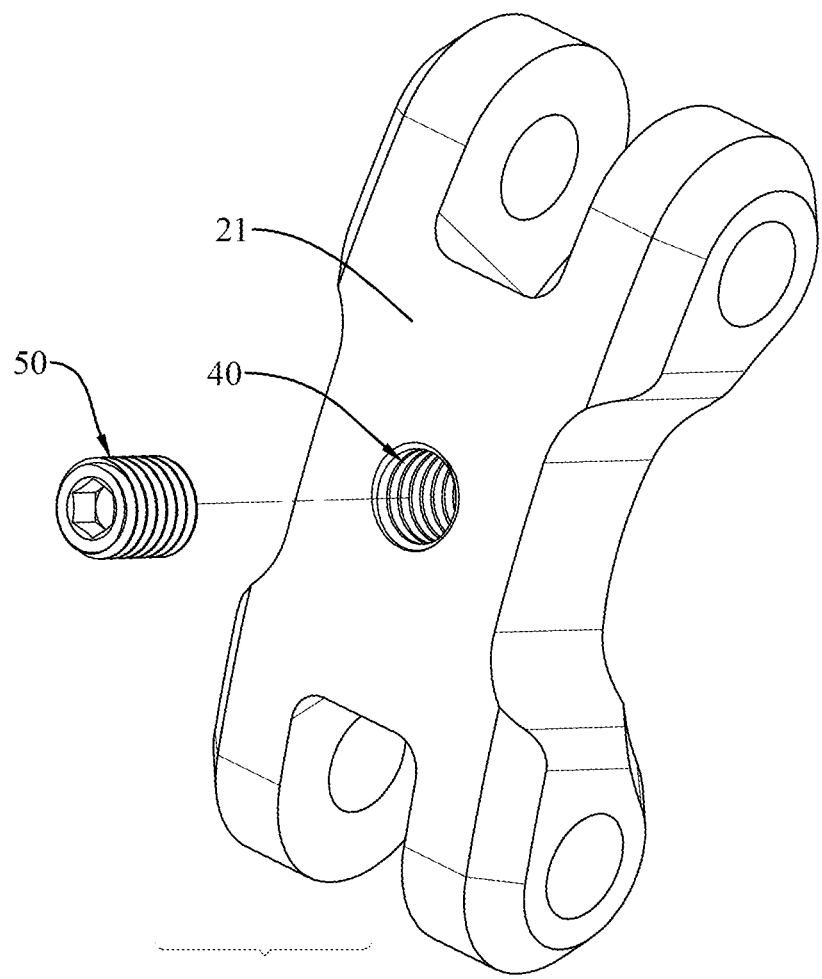
FIG. 17 is an enlarged exploded perspective view of a link and a locating pin of the seatpost in FIG. 15.

With reference to FIG. 15 to FIG. 17, in the twelfth preferred embodiment in accordance with the present invention, two locating holes 40 are defined in the linkage assembly 20 as the interlocking parts 211. Preferably, the two locating holes 40 is defined respectively at two ends of a diameter of the elastic component 30 and are located at two of the links 21 of the linkage assembly 20 respectively. In the embodiment, each of the locating holes 40 is a threaded hole, and two locating pins 50 are threaded into the locating holes 40 respectively. Preferably, each of the locating pins 50 has a threaded surface corresponds to each of the threaded locating hole 40. One end of each of the locating pins 50 slightly extends into the space 22 formed within the linkage assembly 20, and the locating pins 50 rest against the circumferential surface of the elastic component 30. In this embodiment, each of the two locating pins 50 is a bolt. The locating pins 50 ensure the precise positioning of the elastic component 30 within the space 22. Preferably, one end of each of the locating pin 50 extends into one of the interlocking indentations 31 along the circumferential surface of the elastic component 30 to further secure the positioning of the elastic component 30.

Preferably, when the elastic component 30 is positioned within the space 22, a gap 27 is formed between the elastic component 30 and at least one of the links 21. When an external force is applied to the linkage assembly 20, the pivots 24 of the linkage assembly 20 respond to this force and alter a shape of the space 22. Simultaneously, the elastic component 30 undergoes deformation, effectively achieving a shock-absorption effect in response to the external force.

Preferably, the space 22 has an elliptical shape, with two of the links 21 positioned at ends of a major axis of the space 22, while the other two links 21 are positioned at ends of a minor axis of the space 22. When the elastic component 30 is placed within the space 22, the elastic component 30 forms two gaps 27 with the two links 21 located at the ends of the major axis.

When the external force is applied to the linkage assembly 20 and causes changes in the shape of the space 22, the elastic component 30 is deformed. The elastic component 30 is deformed towards the gaps 27. With the gaps 27, the elastic component 30 can withstand larger external forces and exhibit a greater degree of deformation capacity. This capability allows the suspension seatpost 10 in accordance with this invention to manifest diverse shock-absorption effects.

Figure 18:
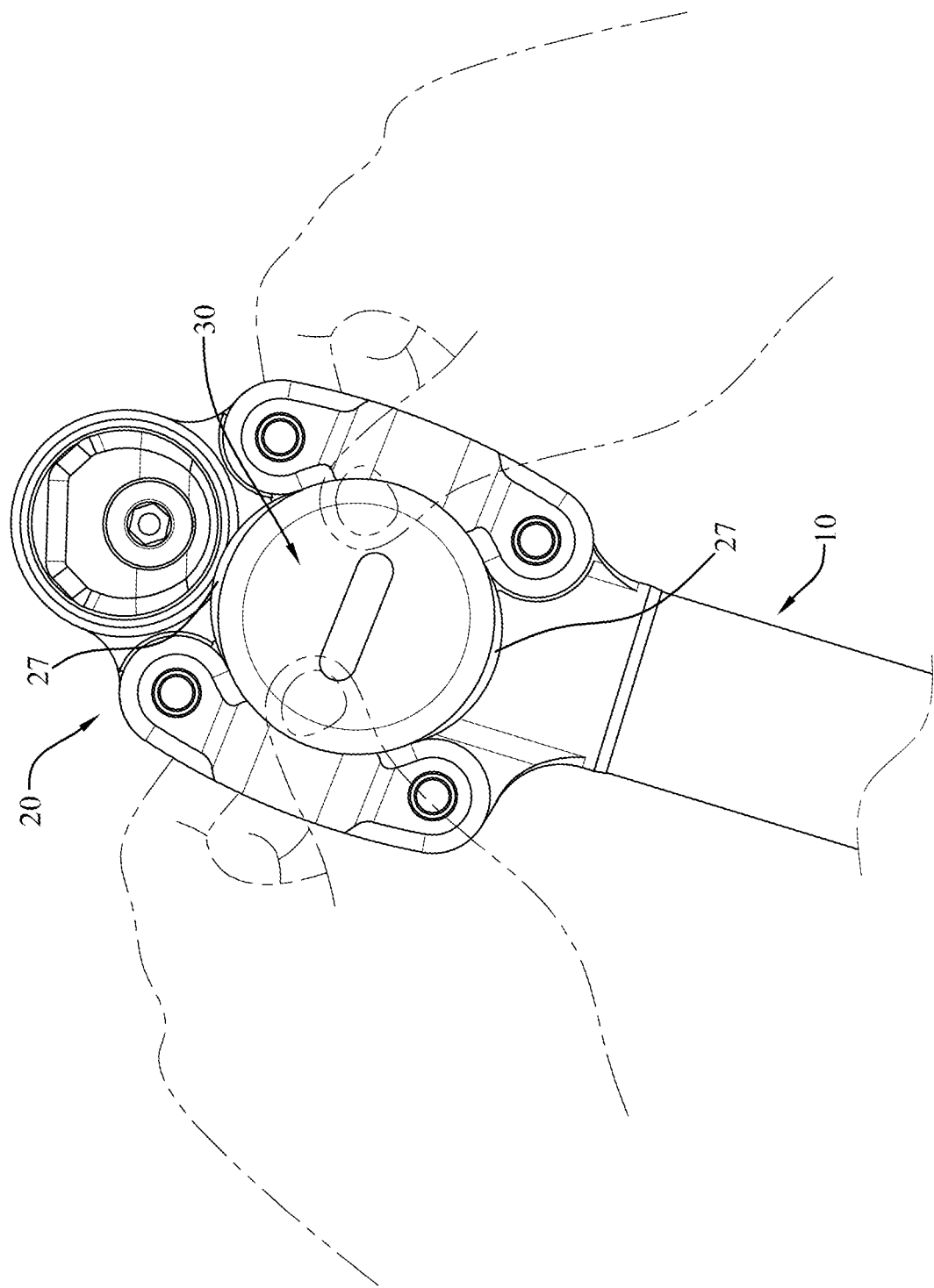
FIG. 18 is an operational side view illustrating an operation of changing an elastic component of the seatpost in FIG. 15.

With reference to FIG. 18, to adjust the elastic coefficient of the elastic component 30, a user can first use a hex key, a screwdriver, or other hand tools, to slightly loosen the two locating pins 50 to cause one end of one of the locating pins 50 to disengage from its position against the circumferential surface of the elastic component 30, rotate the elastic component 30 to a desired position with different elastic coefficients, and tighten the locating pins 50 to make sure the locating pins 50 rest against the circumferential surface of the elastic component 30. The elastic coefficient of the elastic component 30 can be conveniently adjusted without the need to disassemble the linkage assembly 20.

Figure 19:
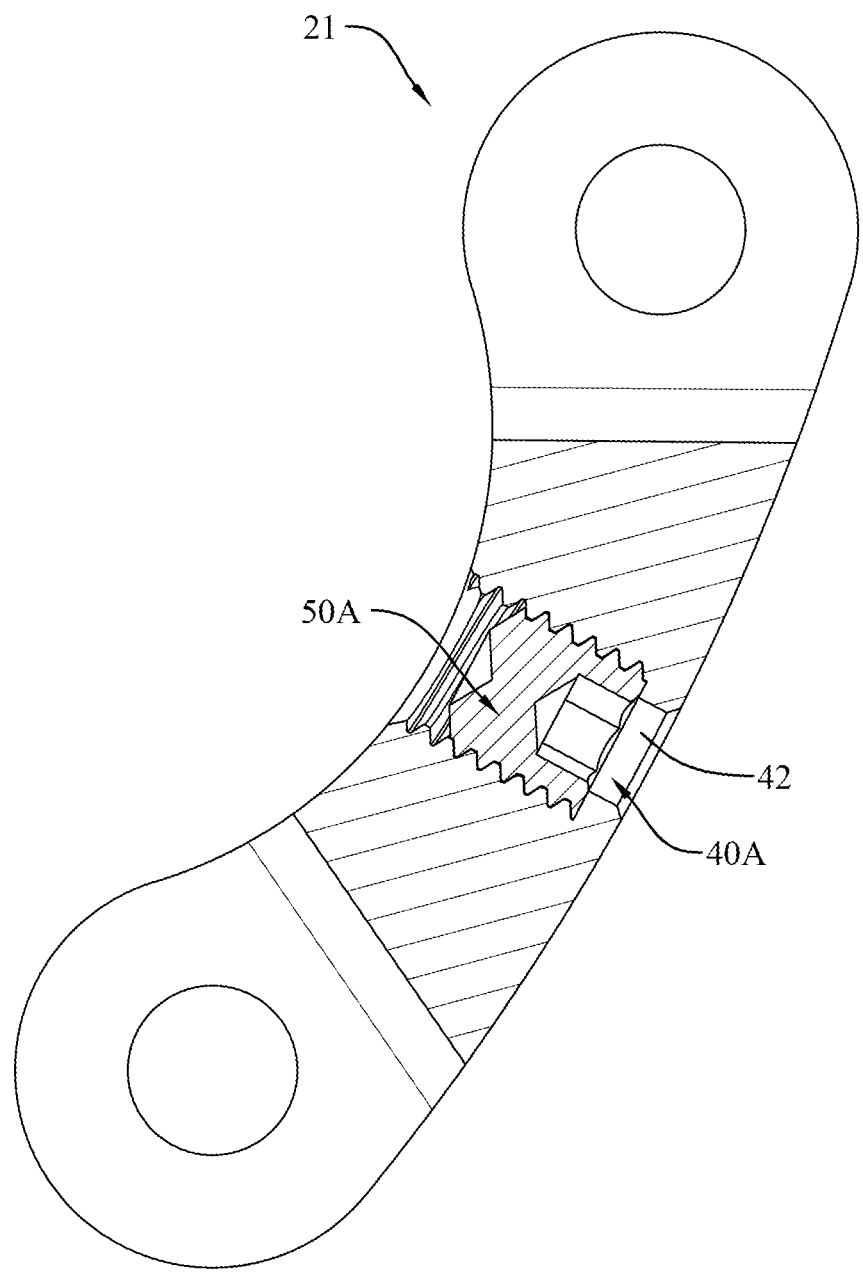
FIG. 19 is a side view in partial section of a second preferred embodiment of a link and a locating pin of the seatpost in accordance with the present invention.

With reference to FIG. 19, in a thirteenth preferred embodiment, an unthreaded hole 42 is formed in each of links 21 having the locating holes 40A at a position away from the space 22. The unthreaded hole 42 has a smaller diameter than a diameter of the locating hole 40A. Two locating pins 50A can be threaded into the locating holes 40A respectively through the space 22. The two locating pins 50A can be screwed against the circumferential surface of the elastic component 30, effectively achieving the positioning of the elastic component 30 within the space 22.

Figure 20:
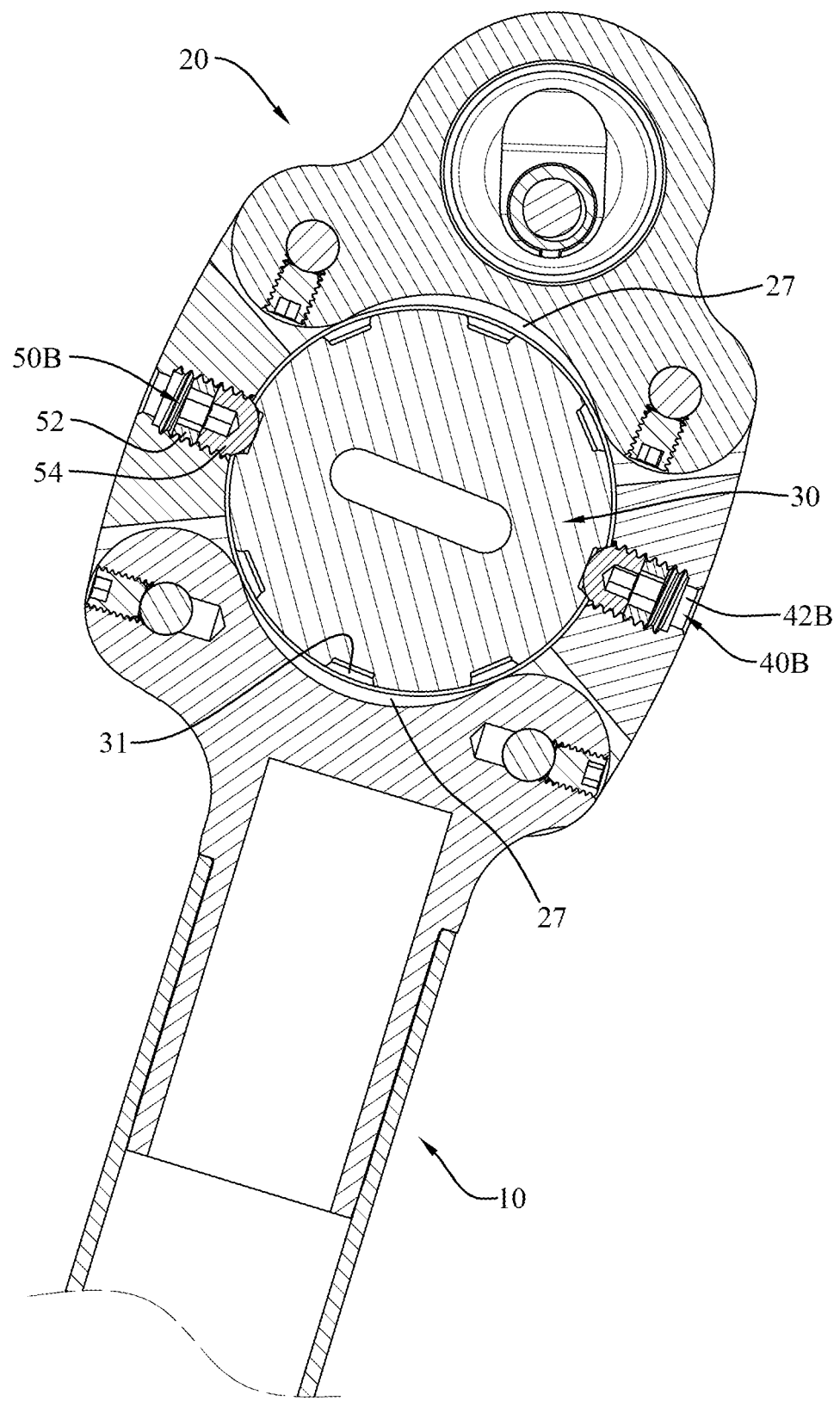
FIG. 20 is a cross section side view of a seat post with a third preferred embodiment of links and locating pins in accordance with the present invention.

With reference to FIG. 20, in a fourteenth preferred embodiment, an unthreaded hole 42B is formed in each of the links 21 having the locating holes 40B at a position away from the space 22. The unthreaded hole 42B has a smaller diameter than a diameter of the locating hole 40A. Each of two locating pins 50B includes a nut 52 and a bolt 54. The nut 52 is equipped with a through-hole that prevents relative rotation with tools. A tool hole is formed in one end of the bolt 54 facing the nut 52. With this configuration, the nut 52 and the bolt 54 of each of the locating pins 50B can be sequentially threaded into the locating hole 40B from the space 22 using the hand tools. The two locating pins 50B can be screwed against the circumferential surface of the elastic component 30, effectively achieving the positioning of the elastic component 30 within the space 22.

Figure 21:
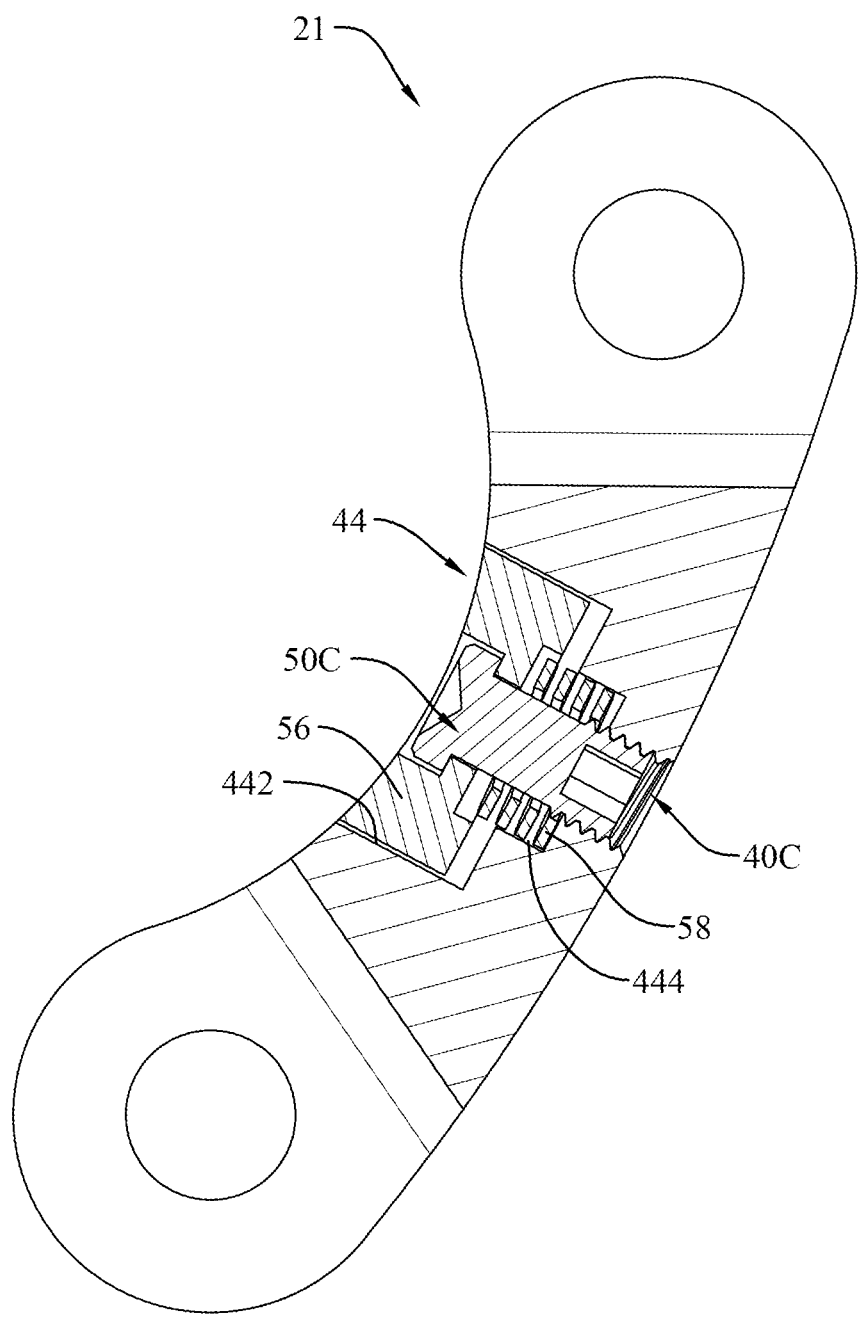
FIG. 21 is a side view in partial section of a fourth preferred embodiment of a link and a locating pin of the seatpost in accordance with the present invention.

With reference to FIG. 21, in a fifteenth preferred embodiment, two cavities 44 are formed in each of the links 21 having the locating holes 40C in a side facing the space 22, and the cavities 44 comprises a first cavity 442 with a large diameter and a second cavity 444 with a small diameter. An abutment ring 56 is held within the first cavity 442 and connected with one of the locating pins 50C, and an elastic element 58 is positioned within the second cavity 444. One end of the elastic element 58 abuts against the abutment ring 56, and the other end of the elastic element 58 abuts against a bottom surface of the second cavity 444. Preferably, the elastic element 58 is a spring. When the locating pin 50C is rotated to rest against the circumferential surface of the elastic component 30, the abutment ring 56 presses against the elastic element 58, compressing the elastic element 58 and generating elastic tension. This tension enhances the force applied by the locating pin 50C against the circumferential surface of the elastic component 30, thus providing a more secure positioning of the elastic component 30.

Figure 22:
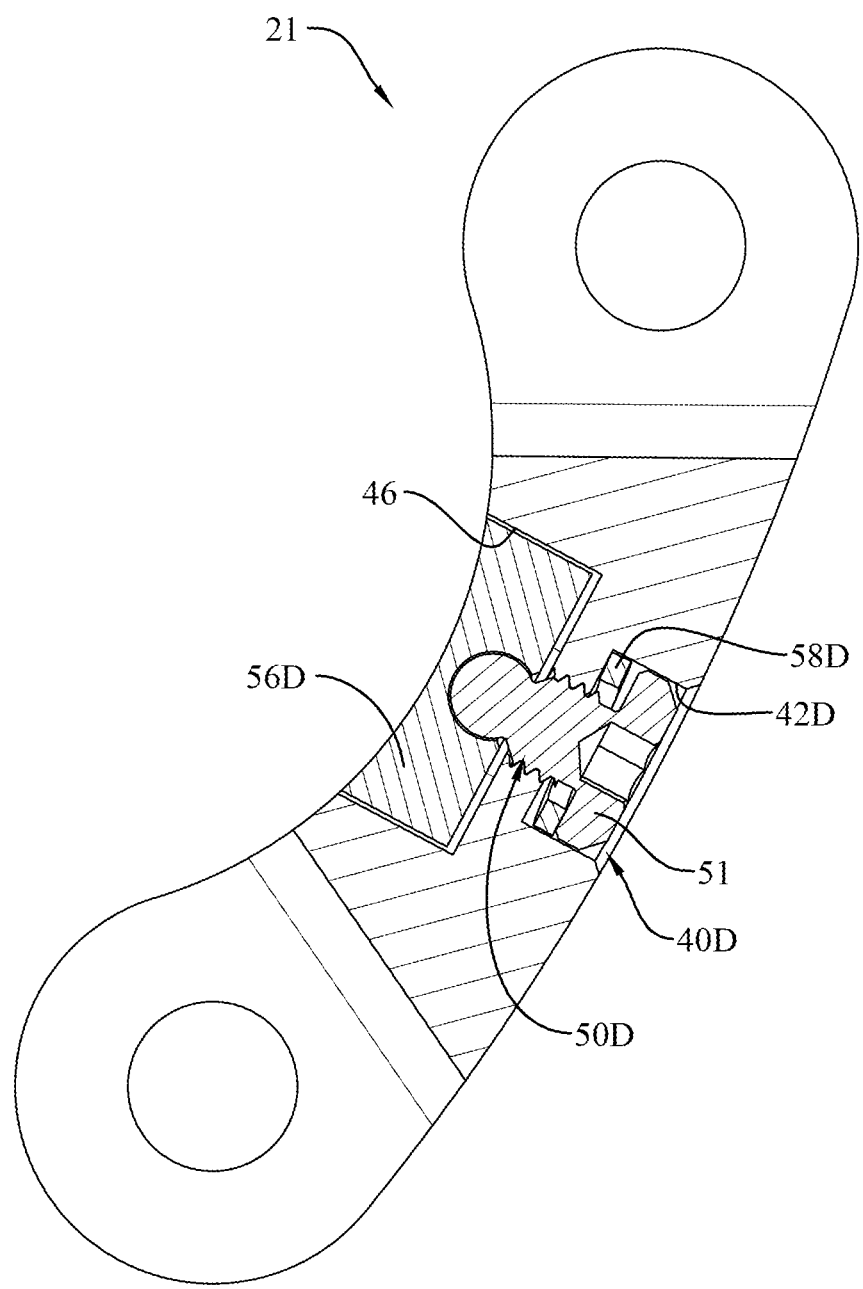
FIG. 22 is a side view in partial section of a fifth preferred embodiment of a link and a locating pin of the seatpost in accordance with the present invention.

With reference to FIG. 22, in a sixteenth preferred embodiment, a cavity 46 is formed in each of links 21 having the locating holes 40C in a side facing the space 22, and an unthreaded hole 42D is formed in the link 21 at a position away from the space 22. The cavity 46 is equipped with an abutment element 56D, and an expanded head 51 is formed in one end of a locating pin 50D away from the space 22, wherein the locating pin 50D is placed in the unthreaded hole 42D. An elastic piece 58D is positioned with two ends of the elastic piece 58D resting against a surface of the unthreaded hole 42D and the head 51 of the locating pin 50D.

Preferably, the locating pin 50D is designed with a spherical coupling portion at one end, the spherical coupling portion oriented towards the abutment element 56D. On a side of the abutment element 56D facing the locating pin 50D, a coupling groove is recessed to accommodate the spherical coupling portion. This arrangement enables the locating pin 50D and the abutment element 56D to rotate freely in relation to each other. When the locating pin 50D is screwed, the abutment element 56D can be laid against the circumferential surface of the elastic component 30, and the elastic piece 58D is compressed. This increases the force applied by the locating pin 50D against the circumferential surface of the elastic component 30, thereby ensuring a secure positioning of the elastic component 30.

Based on the aforementioned description, the present invention has the following advantages:
1. The suspension seatpost in accordance with this invention incorporates a non-isotropic elastic component within the linkage mechanism. The elastic component can be easily rotated to adjust different suspension effects of the suspension seatpost. This adjustability enables easy modification of the suspension effects of the seatpost. This design eliminates the need for complex setup or replacement of the entire seatpost and facilitates high customization.
2. The elastic component in accordance with this invention features a diverse distribution of holes, pores, or materials with varying elastic coefficients. This versatility allows for easy adjustments to the suspension performance of the bicycle seatpost, ensuring a more comfortable riding experience.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:
1. A suspension seatpost comprising a linkage assembly and an elastic component, wherein
the linkage assembly defines a space, and the elastic component is placed in the space;
the elastic component comprises at least two different elastic coefficients; and
the elastic component is aligned to multiple interlocking parts of the linkage assembly in multiple different modes and placed in the space, wherein
the interlocking parts comprise two locating holes defined in the linkage assembly, and two locating pins are mounted in the two locating holes respectively, wherein one end of each of the two locating pins extends into the space; and the two locating holes are threaded holes and each of the two locating pins comprises a bolt with a threaded surface.

2. The suspension seatpost according to claim 1, wherein the elastic component is made of one single material.

3. The suspension seatpost according to claim 2, wherein the elastic component comprises a hole, and the hole is an elongated through hole with two rounded ends.

4. The suspension seatpost according to claim 1, wherein the elastic component comprises a hole, and the hole is an elongated through hole with two rounded ends.

5. The suspension seatpost according to claim 4, wherein the elastic component comprises multiple holes, the holes are embedded inside or extend through the elastic component.

6. The suspension seatpost according to claim 4, wherein the elastic component comprises a porous structure with multiple pores, and the pores are not uniformly distributed within the elastic component.

7. The suspension seatpost according to claim 1, wherein the elastic component comprises an encapsulating material and an encapsulated material, wherein the encapsulated material is at least partially embedded within the encapsulating material, and the encapsulating material and the encapsulated material have different elastic coefficients.

8. The suspension seatpost according to claim 1, wherein the elastic component comprises multiple holes, the holes are embedded inside or extend through the elastic component.

9. The suspension seatpost according to claim 1, wherein one side of each one of the locating holes comprise an unthreaded hole, and a diameter of the unthreaded hole is smaller than a diameter of the locating hole.

10. The suspension seatpost according to claim 1, wherein each locating pin further comprises a nut, wherein the nut of each locating pin is equipped with a through-hole that prevents relative rotation with tools, and the bolt of each locating pin further comprises a tool hole formed at one end of the bolt facing the nut.

11. The suspension seatpost according to claim 1, wherein
two cavities are formed in the linkage assembly at positions defining the locating holes and communicating with the space, wherein each cavity comprises a first cavity with a large diameter and a second cavity with a small diameter; and an abutment ring is held within the first cavity of each of the cavities and connected with a corresponding one of the locating pins, and an elastic element is positioned within the second cavity of each of the cavities, wherein one end of the elastic element abuts against the abutment ring, and the other end of the elastic element abuts against a bottom surface of the second cavity.

12. The suspension seatpost according to claim 11, wherein the elastic element is a spring.

13. The suspension seatpost according to claim 1, wherein
two cavities are formed in the linkage assembly respectively at positions defining the locating holes and communicating with the space, wherein an unthreaded hole is formed in the other end of each of the locating holes away from the space;

each cavity is equipped with an abutment element, and an expanded head is formed in one end of a corresponding one of the locating pins away from the space, wherein the expanded head of the locating pin is placed in the unthreaded hole; and an elastic piece is positioned within the unthreaded hole in each of the locating holes and has two ends resting against a surface of the unthreaded hole and the head of the corresponding one of the locating pins respectively.

* * * * *